United States Patent [19]

Reitmeier et al.

[11] Patent Number: 4,622,577
[45] Date of Patent: Nov. 11, 1986

[54] DECODER FOR EXTRACTING A 4:3 ASPECT RATIO SIGNAL FROM A HIGH DEFINITION TELEVISION SIGNAL

[75] Inventors: Glenn A. Reitmeier, Trenton; Curtis R. Carlson, Princeton, both of N.J.

[73] Assignee: RCA Corporation, Princeton, N.J.

[21] Appl. No.: 576,915

[22] Filed: Feb. 3, 1984

[51] Int. Cl.[4] .......................................... H04N 11/20
[52] U.S. Cl. ...................................... 358/11; 358/140
[58] Field of Search ................... 358/11, 180, 140, 12, 358/13, 141

[56] References Cited

U.S. PATENT DOCUMENTS

| | | | |
|---|---|---|---|
| 3,617,626 | 11/1971 | Bluth | 358/12 X |
| 3,781,463 | 12/1973 | Van den Bussche | 358/12 |
| 4,125,862 | 11/1978 | Catano | 358/140 |
| 4,163,247 | 7/1979 | Bock et al. | 358/12 |
| 4,249,211 | 2/1981 | Baba et al. | 358/180 X |
| 4,335,393 | 6/1982 | Pearson | 358/11 X |
| 4,394,690 | 7/1983 | Kobayashi | 358/180 |
| 4,567,508 | 1/1986 | Huyler | 358/11 |

FOREIGN PATENT DOCUMENTS

| | | | |
|---|---|---|---|
| 0065965 | 4/1982 | Japan | 358/12 |
| 2108354 | 5/1983 | United Kingdom | 358/11 |

OTHER PUBLICATIONS

Article by R. Jurgen entitled, "The Problems and Promises of High Definition Television", published in IEEE Spectrum, Dec. 1983, pp. 46-51.
U.S. patent application entitled, "Compatible Wide-Screen Color Television System", Ser. No. 350,088 filed 2/18/82, in the name of R. Dischert, et al.
U.S. patent application entitled "Kinescope Blanking Scheme for Wide Aspect Ratio Television", Ser. No. 551,918, filed 11/15/83, in the name of R. Dischert.
U.S. patent application entitled, "Transmission of Reduced Resolution Picture Edge Information using Horizontal Blanking Interval" in the name of Glenn A. Reitmeier, U.S. Ser. No. 06/576,916, filed Feb. 3, 1984.
Paper "Future Developments for Enhanced Television in DBS, Cable, and other New Media", Kerns H. Powers presented at Tenth International Broadcasting Convention (IBC) at Brighton, U.K., Sep. 21-25, 1984.
Broder Wendland, *SMPTE Journal*, Oct., 1983, pp. 1034-1035.
"Extended-Definition Television Service", T. S. Robson, *IEE Proc.*, vol. 129, Pt. A, No. 7, Sep., 1982, pp. 485-492.
"The Future of High-Definition Television: Conclusion of a Report of the SMPTE Study Group on High-Definition Television", Donald G. Fink, *SMPTE Journal*, Mar., 1980, vol. 89, pp. 153-161.

*Primary Examiner*—John W. Shepperd
*Assistant Examiner*—Michael P. Dunnam
*Attorney, Agent, or Firm*—P. J. Rasmussen; P. M. Emanuel; R. G. Coalter

[57] ABSTRACT

In a television receiver, a demultiplexer for a high definition multiplexed analog component television signal provides samples of each component signal. A group of samples for each component signal is selected according to the aspect ratio of the television receiver display, and according to the aspect ratio of the picture contained in the high definition multiplexed analog signal so that the selected group is the one that provides picture information which fits the aspect ratio of the display. The selected samples for one scan line are first stored during the active scan line time and then read out sequentially during the subsequent scan line time. The stored samples of each component signal are read out sequentially during substantially the same time period to provide the required Y, U, V signals. A similarly designed demultiplexer may be used to process an extended aspect ratio frequency multiplexed signal such as a high definition NTSC-formatted signal.

4 Claims, 9 Drawing Figures

STANDARD OR HIGH DEFINITION MAC SIGNAL 200

HIGH DEFINITION NTSC FORMATTED SIGNAL 600

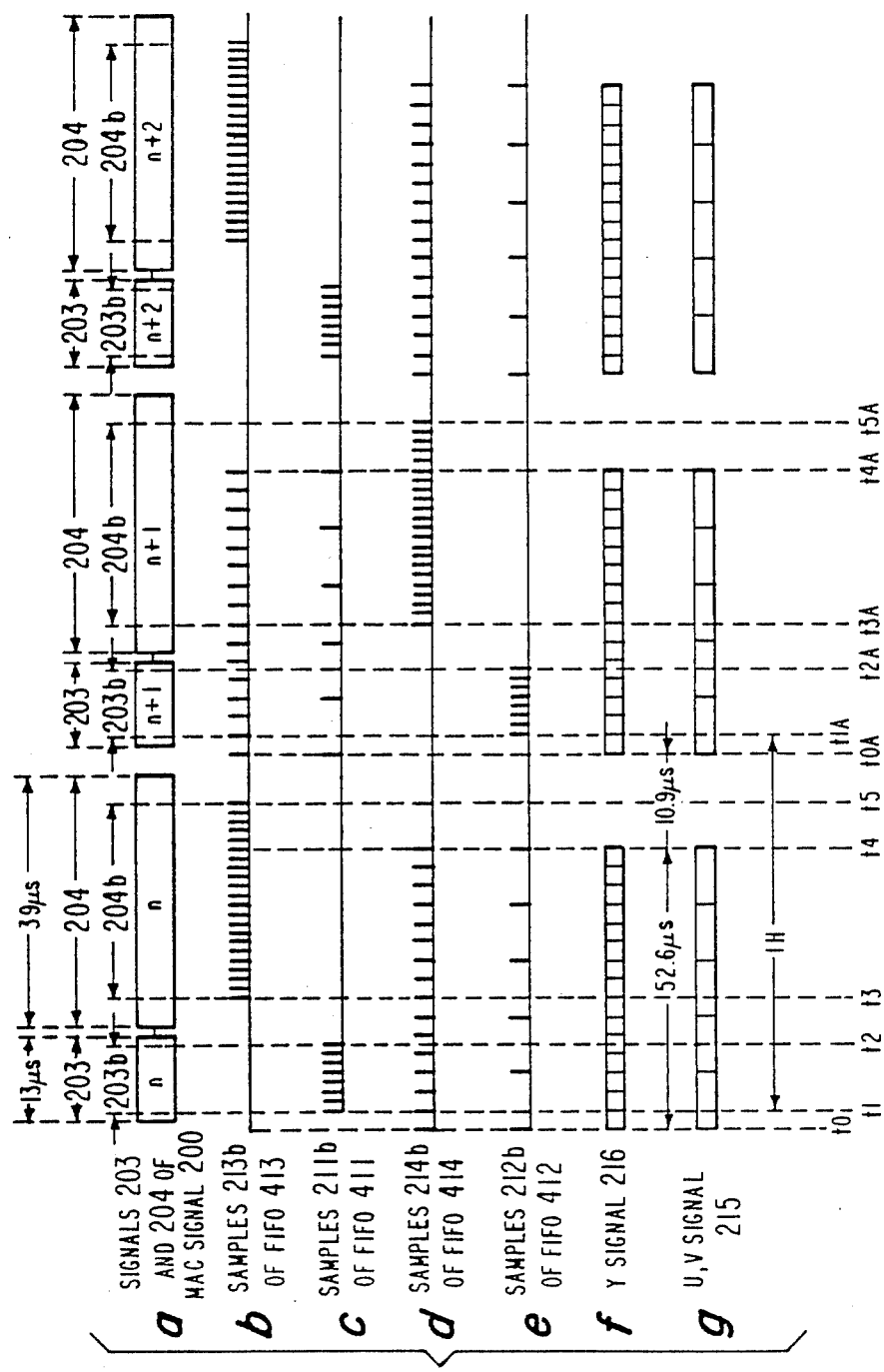

DECODER FOR EXTRACTING A 4:3 ASPECT RATIO SIGNAL FROM A HIGH DEFINITION TELEVISION SIGNAL

BACKGROUND OF THE INVENTION

The invention relates to a television signal decoder for separating a chrominance signal and its corresponding luminance signal from a time division multiplexed component television signal such as standard Multiplexed Analog Component (MAC) signal.

The invention also relates to a decoder capable of extracting an equal or smaller aspect ratio picture information from a high definition television signal that provides extended aspect ratio picture information, such as a high definition MAC signal or a high definition frequency multiplexed component signal such as a high definition NTSC signal.

In an NTSC television system, for example, the ratio of the picture width to its height at the display device is 4:3. This ratio is called the aspect ratio. Recently, there has been an interest in using wider aspect ratios for television systems such as 2:1 or 5:3 ratios, which more nearly equal the ratio of width to height that is viewed by the human eye. The 5:3 aspect ratio has received particular attention since release prints for motion pictures film in the United States employ this ratio and thus the pictures of such prints may be transmitted and received without cropping.

It may be desirable to provide video information of a picture having extended aspect ratio in a MAC signal format, for example. In such a case, the MAC signal is called a high definition MAC signal.

It may be also desirable to display a high definition MAC signal in a receiver having a smaller aspect ratio display, by displaying only that portion of the picture which fits the display.

One feature of the invention is a decoder for receiving a high definition television signal such as high definition MAC signal, and for selectively providing video signals compatible with the aspect ratio of the television receiver such that the corresponding picture is displayed in such receiver without suffering dimensional distortions. This flexibility in selectively cropping out a portion of the transmitted picture to fit the television receiver may be achieved by the decoder of the invention without unduly complicating its circuits.

BRIEF DESCRIPTION OF THE DRAWINGS

FIG. 6(a–g) illustrate timing diagrams of the demultiplexer of FIG. 5 for processing the MAC signal of FIG. 2;

SUMMARY OF THE INVENTION

The invention relates to a television apparatus for displaying a portion of a picture in an image area of a television display having a first aspect ratio a portion of a picture. The picture portion also has the first aspect ratio while the picture itself has a different, second aspect ratio. A first video signal supplies the contents of the picture to the television apparatus. A second video signal is generated from a part of the first video signal. The second video signal supplies only the contents of the picture portion for displaying the contents in the image area of the television display.

The invention also relates to a television apparatus for generating in a television display a display video signal derived from an incoming video signal that contains an incoming picture. An aspect ratio indicative signal is generated that is indicative of at least one of the following: (a) the aspect ratio of the incoming picture contained in the incoming video signal, (b) the aspect ratio of the image area of the television display. The aspect ratio associated with the display video signal is selected in accordance with the aspect ratio indicative signal.

DETAILED DESCRIPTION OF THE INVENTION

Figure 1A:
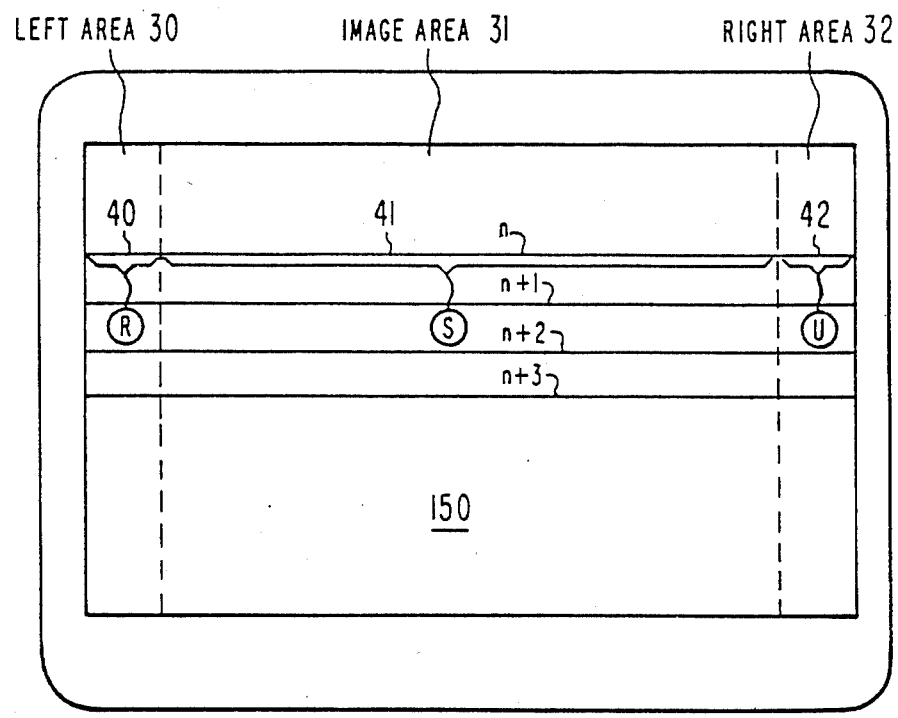
FIGS. 1a and 1b illustrate the correspondence between the portions of a high definition signal illustrated in FIG. 1b and the portions of a scan line in an image area illustrated in FIG. 1a which has an extended aspect ratio and which is suitable for displaying the high definition signal.

FIG. 1a illustrates an image area 150 having a high definition aspect ratio, 5:3 for example, which may represent an image in a television camera or in a display. Image area 150 includes image area 31 having a given aspect ratio, 4:3 for example, disposed between a left area 30 and a right area 32. Each of the scan lines in the display, such as scan lines n, n+1, n+2 and n+3 of FIG. 1a includes a left edge 40, an inner range 41 and a right edge 42 provided in areas 30, 31 and 32, respectively.

Figure 2:
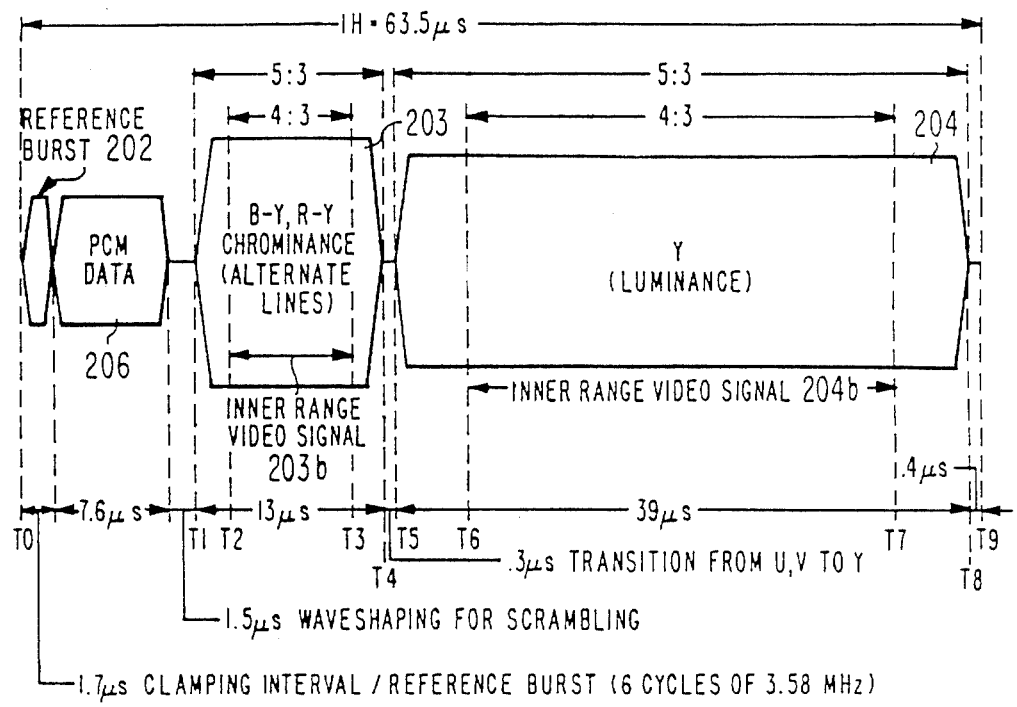
FIG. 2 illustrates one scan line time of a standard or high definition MAC signal.

A high definition MAC signal 200, illustrated in FIG. 2, may be generated in a television transmitter, not illustrated in the figures, in the same way that a standard MAC signal 200 is generated, except that the television camera associated with the transmitter scans an image area having the proportional dimensions of area 150 of FIG. 1a.

In FIG. 2, a reference burst signal 202 followed by pulse coded modulation data 206 are provided from a time T0 to a time T1. A chrominance signal 203 providing R-Y or B-Y picture information, in alternate scan lines, is provided from time T1 to a time T4. Signal 203, part of MAC signal 200 of FIG. 2, supplies the chrominance information or contents of a picture to all of scan line n of image area 150 of FIG. 1a. Signal 203 is pervasively distributed between the end times, T1 and T4. Thus, at any instant between times T1 and T4, signal 203 supplies the chrominance picture contents of scan line n. Furthermore, signal 203 supplies the chrominance picture contents of the two ends of scan line n, at times T1 and T4, respectively. Signal 203 includes a symmetrically disposed signal portion 203b that is provided from time T2 to time T3. Signal portion 203b provides R-Y and B-Y picture information of inner range 41 of the scan lines of FIG. 1a. Thus, signal 203b may be separated from signal 203 to provide picture information for presentation in a display having the same aspect ratio as image area 31 of FIG. 1a. The length of the interval T2-T3 of FIG. 2 relative to the interval T1-T4 determines the aspect ratio of the picture provided by signal 203b.

Figure 1B:
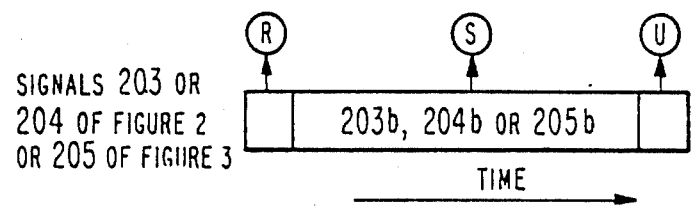

From time T5 to time T8, a luminance signal 204 is provided. Signal 204, part of MAC signal 200 of FIG. 2, supplies the luminance information or contents of a picture to all of scan line n of image area 150 of FIG. 1a. Signal 204 is pervasively distributed between the end times, T5 and T8. Thus, at any instant between times T5 and T8, signal 203 supplies the luminance picture contents of scan line n. Furthermore, signal 204 supplies the luminance picture contents of the two ends of scan line n, at times T5 and T8, respectively. Similarly to signal 203, signal 204 includes a symmetrically disposed signal portions 204b between times T6 and T7 for supplying luminance information of inner range 41 of the scan lines of FIG. 1a. FIG. 1b illustrates the correspondence between a scan line such as scan line n of FIG. 1a and signal 203 or 204 of FIG. 2. As may be deduced from FIGS. 1a and 1b, the relative time of signal 203b in relation to the entire signal 203, for example, determines the aspect ratio of a picture derived from signal 203b. Thus, in the special case in which signal 203b occupies the entire time slot of signal 203, the aspect ratio of a picture derived from signal 203b is equal to that derived from the entire signal 203.

The same FIG. 2, in addition to illustrating a MAC signal of an extended 5:3 aspect ratio picture, may also be used to illustrate the timing for standard MAC signal of a conventional 4:3 aspect ratio picture. MAC signal 200, now representing a standard signal, includes burst reference 202, pulse code modulation data 206, signal 203 and signal 204 at the same times as in the previous case where MAC signal 200 was a high definition MAC signal. It should be understood that times T2, T3, T6 and T7 of FIG. 2 have no significance in the case of FIG. 2 representing a standard definition MAC signal since signals 203 and 204 provide the entire 4:3 aspect ratio picture information.

Figure 4:
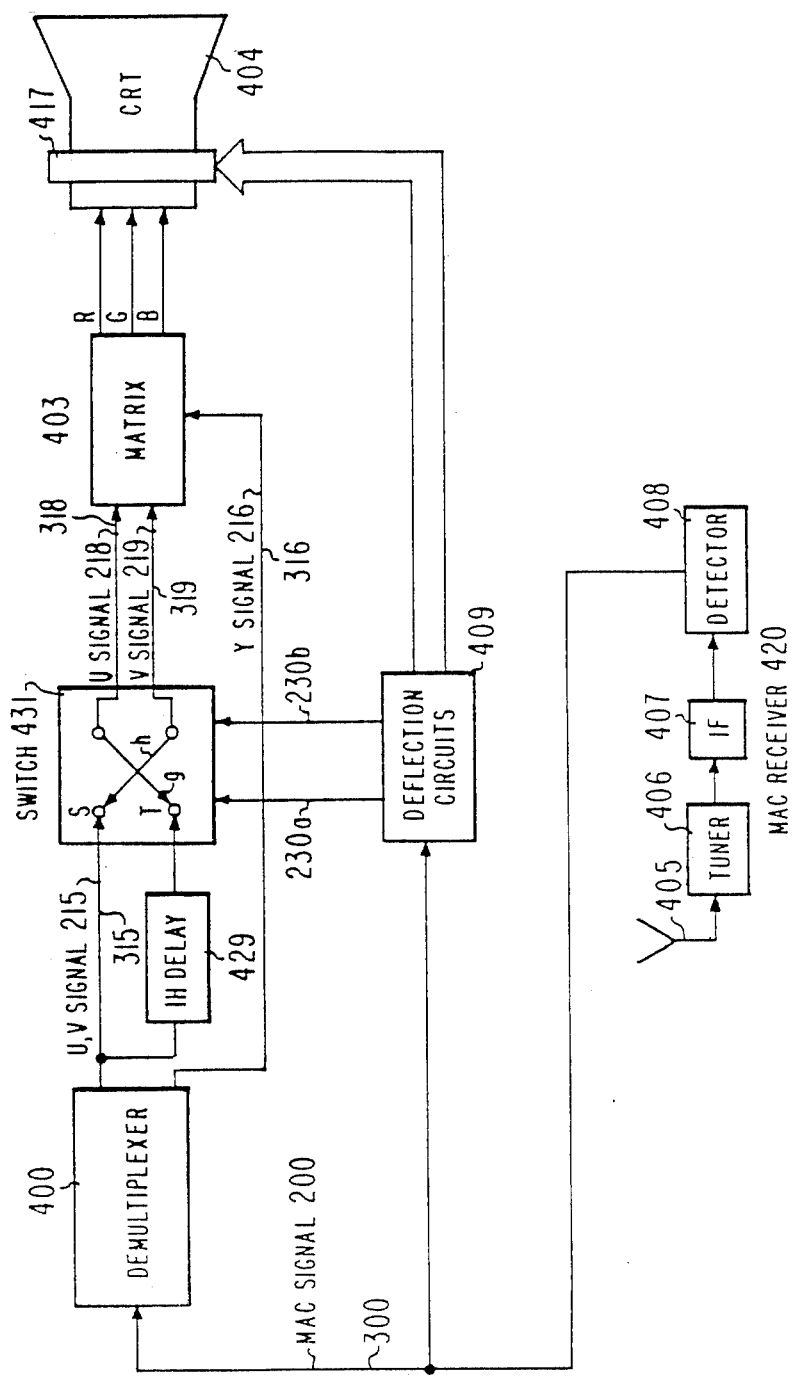
FIG. 4 illustrates a television receiver for processing a standard or high definition MAC signal, embodying one aspect of the invention.

FIG. 4 illustrates a block diagram of a MAC receiver 420 embodying one aspect of the invention, for processing and displaying a television signal containing a high or standard definition MAC signal 200 of FIG. 2 in a display such as a cathode ray tube. It includes an antenna 405 coupled to a tuner 406 which selects the desired channel, amplifies and down-converts the signal to an intermediate frequency. An IF amplifier 407 further amplifies the IF signal and applies it to a detector 408 to form MAC signal 200 of FIG. 2.

MAC signal 200 is provided to a demultiplexer 400, embodying one aspect of the invention, as described later on, along a line 300. Demultiplexer 400 provides a Y signal 216 along a line 316 and a U, V signal 215 along a line 315. Y signal 216 provides the luminance video information; whereas, U, V signal 215 provides the chrominance video information. The alternating line R-Y and B-Y contents of chrominance signal 203 of FIG. 2 provides on a corresponding alternating line-by-line basis the U and V contents, respectively, of U, V signal 215.

U, V signal 215 is coupled to a terminal S of a cross coupling switch 431 and also to a terminal T of switch 431 through a 1H delay 429, providing a delay of one scan line time. A wiper g of switch 431 couples U, V signal 215 at terminal S to a line 318 when U, V signal 215 contains B-Y picture information, and the repeated U, V signal 215 at terminal T to the same line 318 when U, V signal 215 contains R-Y picture information; thus, a U signal 218 on line 318 contains B-Y picture information only. A wiper h of switch 431 provides a V signal 219 on a line 319 by coupling the signals at terminals S and T, respectively, when wiper g couples the signals at terminals T and S, respectively. Thus, V signal 219 contains R-Y picture information only. Wipers g and h are controlled by a horizontal retrace clock 230a and a vertical retrace clock 230b from deflection circuits 409. Clock 230a causes wipers g and h of switch 431 to change their respective positions at the beginning of each scan line. Clock 230b provides timing information of the first scan line time in a given field.

MAC signal 200 of FIG. 2 may provide B-Y information in the first scan line time of a given field, for example. Consequently, wiper g and h are controlled by clock 230b to couple the signals at terminals S and T, respectively, during the first scan line time of a given frame. After the first scan line time, wipers g and h change their respective positions at the beginning of each scan line time.

A matrix 403 combines U signal 218, V signal 219 and Y signal 216, in a known manner, to provide R, G, B signals to the corresponding red, green and blue guns of a display 404.

Deflection circuits 409 receive timing information from MAC signal 200 and provide deflection current drive to yoke assembly 417 to affectuate scanning of the electron beams of display 404.

Figure 5:
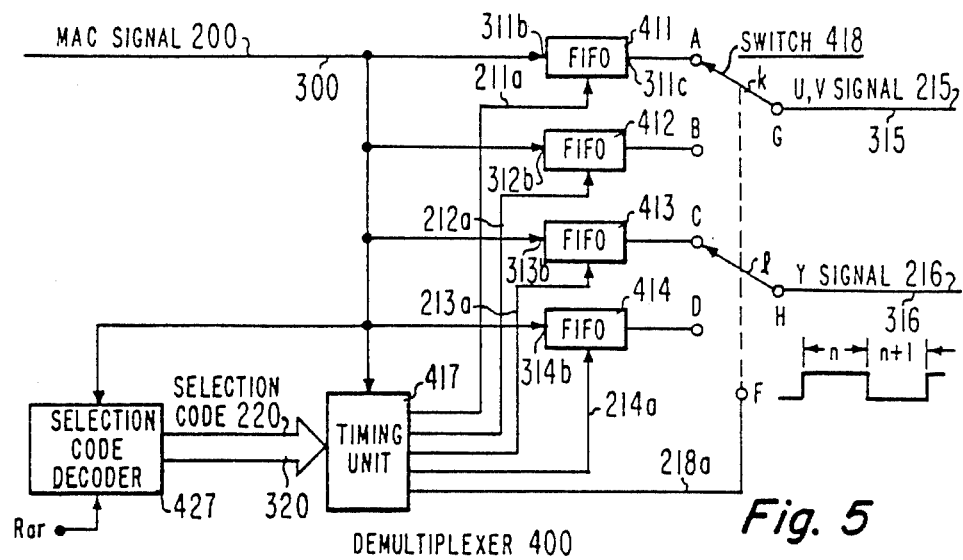
FIG. 5 illustrates a detailed embodiment of the demultiplexer of FIG. 4 in accordance with another aspect of the invention.

FIG. 5 illustrates an embodiment of demultiplexer 400 of FIG. 4, embodying one aspect of the invention. Identical numbers and symbols in FIGS. 4 and 5 indicate similar items or functions.

In FIG. 5, a timing unit 417 receives MAC signal 200 of FIG. 2 and utilizes sync pulse timing information and burst reference 202 of MAC signal 200 of FIG. 2 to provide clocks 211a-214a for clocking FIFO memories 411-414 respectively. Timing unit 417 may utilize pulse 199 for providing a phase reference to conventional phase lock-loop circuits, not illustrated, for obtaining clocks 211a-214a. Each of FIFO memories 411-414, may be a first-in, first-out, CCD type serial memory, arranged similarly to a shift register in digital systems.

FIGS. 6a-6g illustrate timing diagrams of demultiplexer 400 provided in MAC receiver 420 of FIG. 4. MAC signal 200 of FIG. 2 is coupled to input terminals 311b-314b of FIFO memories 411-414, respectively. FIG. 6a illustrates schematically signals 203 and 204 of MAC signal 200 of FIG. 2 containing picture information for display in scan lines n through n+3 of FIG. 1. In FIG. 5, clock 211a provides a series of pulses for sampling signal 203b of FIG. 6a, from time t1 to time t2. Each pulse provides a corresponding sample 211b of signal 203b of scan line n+1, for example, as illustrated by the series of short vertical lines of FIG. 6c between times t1 and t2. Samples 211b are stored sequentially in FIFO memory 411. After the series of samples 211b has been stored in memory 411, it is read out by a corresponding series of pulses of clock 211a, from time t0A to time t4A, occurring during the next scan line time of MAC signal 200 to provide U, V signal 215, as illustrated schematically in FIG. 6g. During this read out time, samples 211b are provided at an output terminal 311c and are coupled to a terminal A of a switch 418. A wiper k of switch 418 couples samples 211b to line 315 for providing U, V signal 215.

Similarly, clock 213a provides a series of pulses for sampling signal 204b of FIG. 6a from time t3 to time t5, as illustrated by the series of short vertical lines of FIG. 6b. Each pulse provides a corresponding sample 213b of signal 204b of scan line n+1 of FIG. 6a between time t3 and t5. Samples 213b are stored sequentially in FIFO memory 413 of FIG. 5. In the next scan line time, samples 213b are read out of FIFO memory 413 by a corresponding series of pulses of clock 213a, from time t0A to time t4A, to provide Y signal 216 of FIG. 6f, providing picture information for display in scan line n+1. During this read out time, samples 213b are provided at an output terminal 313c and coupled to a terminal C of switch 418. A wiper 1 of switch 418 couples samples 213b to line 316 for providing Y signal 216. Signals 215 and 216 are displayed in scan line n+1 of display 404 of FIG. 4 in the interval from t0A to t4A of FIG. 6f or 6g.

FIFO memory 412 performs the analogous operation to that performed by FIFO memory 411 but for alternate scan lines. Likewise, FIFO memory 414 performs the analogous operation to that of FIFO memory 413, and for the same alternate scan lines processed by FIFO memory 412. When FIFO memories 412 and 414 provide signals 215 and 216 of FIGS. 6g and 6f, respectively, from time t0 to time t5, wiper k is at a position B and wiper 1 is at a position D. Wipers k and 1 of switch 418 are controlled by a signal 218a provided at a terminal F of switch 418 by timing unit 417. Signal 218a changes its logical state in the beginning of each scan line in coincidence with the occurrence of sync 199 of FIG. 2.

Clocks 211a, 213a, 212a and 214a have, illustratively, the same programmable frequency, f1, for sampling signals 203b and 204b. Sampling frequency f1 may be generated by a programmable phase-lock loop circuit of timing unit 417, not illustrated, which receives reference burst 202 of FIG. 2 as a phase reference. Frequency f1 provided by timing unit 417 is controlled by a selection code 220. Selection code 220 may be provided, illustratively, by a selection code decoder 427 deriving aspect ratio information from pulse code modulation data 206 of FIG. 2; alternatively, it may be provided by permanent strapping. Decoder 427 is also provided with a signal $R_{ar}$ which is indicative of the aspect ratio of display 404 of FIG. 4 for generating selection code 220. Therefore, code 220 is indicative of at least one of the following: (a) the aspect ratio of the incoming picture contained in MAC 200 of FIG. 2, and (b) the aspect ratio of display 404 of FIG. 4. The detailed design of decoder 427 is not described, as any conventional way of decoding control information embedded in signal 200 of FIG. 2 may be used.

Code 220 identifies to timing unit 417 the location in time where times T2, T3, T6 and T7 occur within high definition MAC signal 200 of FIG. 2; thereby, the code defines the timing of signals 203b and 204b of FIG. 6a. Code 220 also selects the corresponding frequency f1 for clocks 211a–214a generated by timing unit 417 for sampling signals 203 and 204.

In a first situation, signals 203 and 204 of FIG. 2 provide picture information suitable for display in a display having a 4:3 aspect ratio, and display 404 of FIG. 4 has a 4:3 aspect ratio. Signals 203 and 204 consist in their entirety of signals 203b and 204b, respectively. Time T2 of FIG. 2 is identified to timing unit 417 to be coincident with time T1. Likewise, times T3, T6 and T7 are coincident with times T4, T5 and T8, respectively. Code 220 selects the sampling frequency f1 to be, illustratively, 4×Sc, where Sc is the frequency of reference burst 202 of MAC signal 200 of FIG. 2.

In a second situation signals 203 and 204 provide picture information for display in a display having a 5:3 aspect ratio, and display 404 of FIG. 4 has a 5:3 aspect ratio. The operations of demultiplexer 400 of FIG. 5 in the second situation are identical to the operations in the first situation. Therefore, code 220 for the first and second situations need not be different.

In a third situation, signals 203 and 204 provide picture information suitable for display in a display having a 5:3 aspect ratio; whereas, display 404 of FIG. 4 has a 4:3 aspect ratio. In this situation, the time interval T2-T3 of FIG. 2 is 4/5 of the time interval T1-T4 of FIG. 2, and the sampling frequency f1 is 5/4 higher than in the first or second situation. Thus, the number of samples 211b of FIG. 5, for example, is not dependent on the value of code 220. Likewise, the time inteval T6-T7 of FIG. 2 is 4/5 of the time interval T5-T8 of FIG. 2.

The number of samples 213b of FIG. 6b is 3 times the number of samples 211b of FIG. 6c because signal 204 of FIG. 6a occupies a time slot of 39 microseconds, which is 3 times longer than the 13 microseconds of signal 203 of FIG. 6a. Thus, in order to read out samples 213b of FIG. 6b to provide U, V signal 215 of FIG. 6g, clock 211a of FIG. 5, for example, provides read out clock pulses of a frequency 1×Sc, illustratively, from time t0A to time t4A of FIG. 6c, whereas, clock 213a provides read out clock pulses of a frequency 3×Sc during the same period t0A-t4A of FIG. 6b for providing Y signal 216 of FIG. 6f concurrently with U, V signal 215 of FIG. 6g.

It should be understood that other combinations of frequencies of clocks 211a, 212a, 213a and 214a may be utilized within the scope of the invention.

Figure 3:
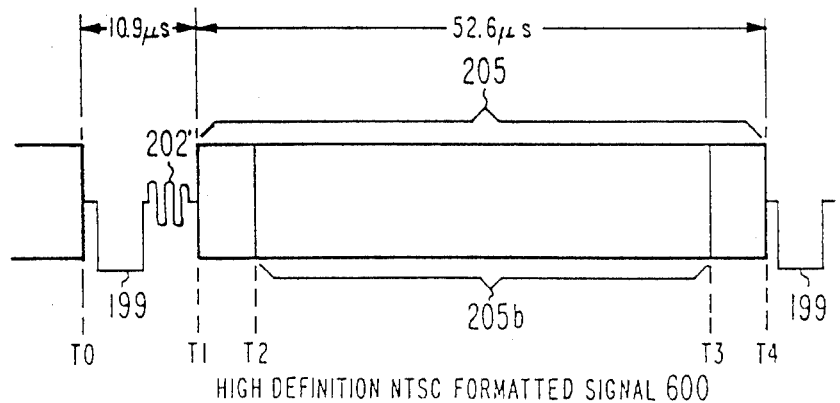
FIG. 3 illustrates one scan line time of a high definition NTSC formatted signal.

FIG. 3 illustrates a high definition NTSC-formatted signal 600 containing frequency multiplexed chrominance and luminance signals for providing high-definition picture information. In order to obtain signal 600 of FIG. 3 in a television transmitter, scan line n, for example, of display 150 of FIG. 1 having extended aspect ratio, is scanned by a television camera during the 52.6 microseconds active scan line time of standard NTSC signal. Thus, the active scan line of the resulting signal provides high definition picture information. The resulting signal is processed as a corresponding signal in a standard NTSC transmitter is processed.

Signal 600 of FIG. 3 includes a sync pulse 199 and a color subcarrier 202' provided from time T0 to time T1. Signal 600 includes an inner range video signal 205b provided from time T2 to time T3, which is disposed symmetrically in a signal 205 that provides picture information of the entire active scan line time. Signal 205 is provided from time T1 to time T4. Signal 205, part of high definition NTSC signal 600 of FIG. 3, supplies the contents of a picture to all of scan line n of image area 150 of FIG. 1a. Signal 205 is pervasively distributed between the end times, T1 and T4. Thus, at any instant between times T1 and T4, signal 205 supplies the picture contents of scan line n. Furthermore, signal 205 supplies the picture contents of the two ends of scan line n, at times T1 and T4, respectively. Signal 205b provides picture information of each scan line in image area 31 of FIG. 1a. FIG. 1b illustrates signal 205b of FIG. 3.

FIGS. 1a and 1b illustrate the correspondence between the video information of the portions of signal 205 of FIG. 1b and the portions of scan line n of FIG. 1a which are located in image area 30, 31, and 32. This correspondence is similar to the correspondence between signals 203 or 204 and scan line n, as described before.

Figure 7:
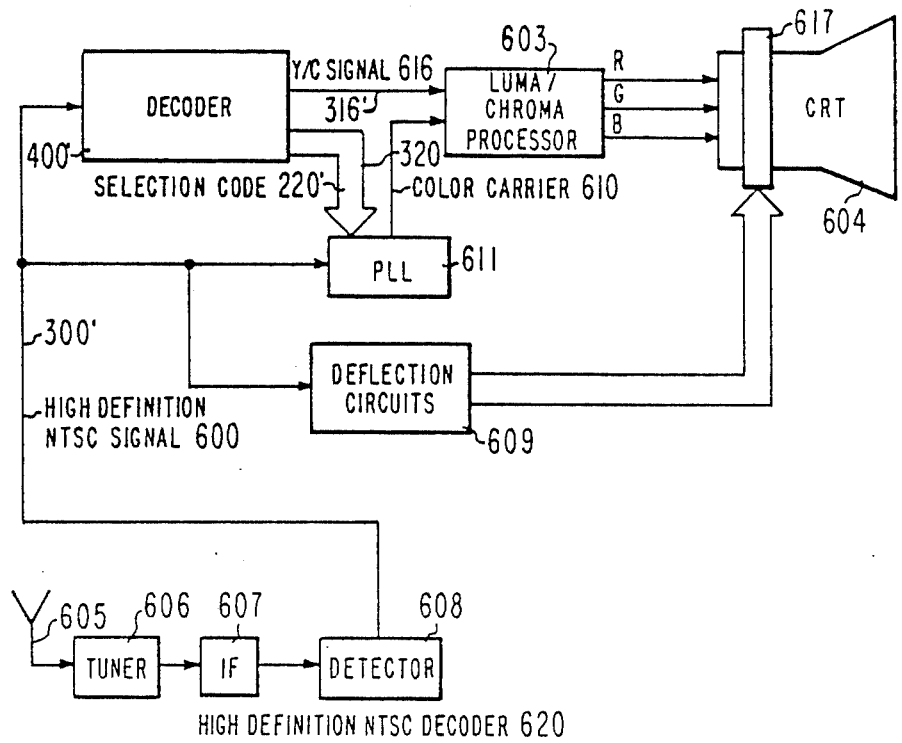
FIG. 7 illustrates a television receiver for processing the high definition NTSC-formatted signal of FIG. 3, embodying yet another aspect of the invention.

FIG. 7 illustrates a television receiver 620 for processing high definition NTSC-formatted signal 600 of FIG. 3, providing 5:3 aspect ratio picture information and for displaying a portion of it in a display, having a 4:3 aspect ratio.

Television receiver 620 of FIG. 7 includes an antenna 605 coupled to a tuner 606 which selects the desired channel, amplifies and down-converts the signal to an intermediate frequency. An IF amplifier 607 further amplifies the IF signal and applies it to a detector 608 to form signal 600.

Figure 8:
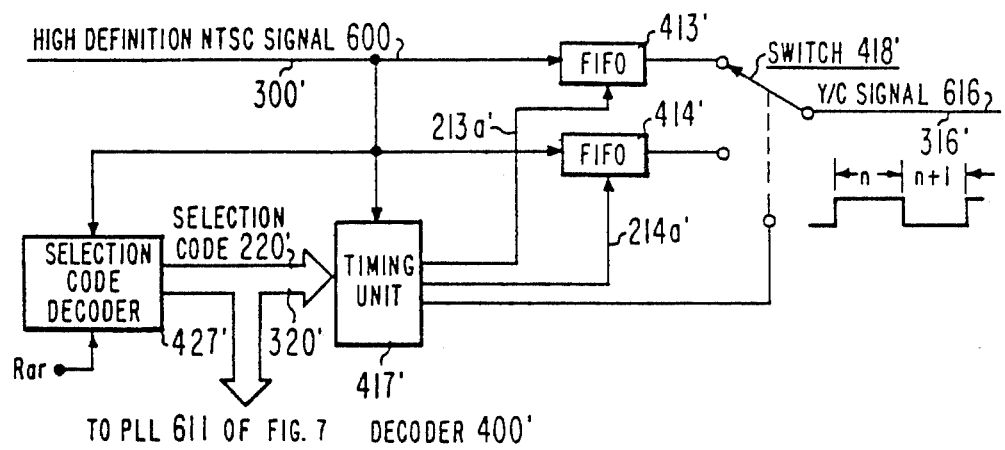
FIG. 8 illustrates a detailed embodiment of the decoder of FIG. 7 in accordance with yet another aspect of the invention.

In FIG. 7, signal 600 is provided to a decoder 400'. FIG. 8 illustrates in detail an embodiment of decoder 400' of FIG. 7 embodying one aspect of the invention. Identical numbers and symbols in FIGS. 7 and 8 indicate similar items or functions. Decoder 400' is similar to a part of demultiplexer 400 of FIG. 5. Decoder 400' includes FIFO memories 413' and 414', a timing unit 417', a selection code decoder 427' and a switch 418' that correspond to FIFO memories 413 and 414, timing unit 417, selection code decoder 427 and switch 418 of demultiplexer 400 of FIG. 5. Likewise, clocks 213a', 214a' and 218a' of decoder 400' of FIG. 8 perform the analogous functions as clocks 213a, 214a and 218a of demultiplexer 400 of FIG. 5. Decoder 400' of FIG. 7 develops Y/C signal 616 on line 316 in the NTSC format of frequency multiplexed Y and C signals corresponding to inner range video signal 205b of FIG. 3. Signal 616 of FIG. 7 is generated by decoder 400' of FIG. 8 from signal 205 of FIG. 1b similarly to the way Y signal 216 of FIG. 4 is generated from signal 204 of FIG. 1b. However, it should be understood that clocks 213a' and 214a' provided by timing unit 417' of decoder 400' of FIG. 8, and employed in the receiver of FIG. 7, are of different timings and frequencies from those provided for processing MAC signal 200 of FIG. 4. This is so because the times T3 and T4 of signal 600 of FIG. 3 are different from the corresponding times T5, T6, T7 and T8, respectively, of signal 200 of FIG. 2.

In FIG. 7, a conventionally designed luma/chroma unit 603 receives signal 616, and a color carrier 610 provided by a phase-lock loop circuit 611 having the frequency of about $4/5 \times Sc$, as described later on, to provide R, G and B signals to a display 604. Color carrier 610 may be provided by phase-lock loop circuit 611 receiving a phase reference from a reference burst 202 of signal 600 of FIG. 3.

Deflection circuits 609 of FIG. 7 receive timing information from signal 600 and provides deflection current drive to yoke assembly 617 to effectuate scanning of the electron beam of display 604.

Color carrier 610 has the frequency of about $4/5 \times Sc$, in contrast to the frequency of $1 \times Sc$ employed in conventional NTSC receivers, because Y/C signal 616 for each of the scan lines of FIG. 1 occupies the entire active scan line time of 52.6 microseconds; whereas, signal 205b of FIG. 3 that contains the same picture information as that provided by signal 616, occupies only approximately 4/5 of the active scan line time, as illustrated schematically in FIG. 3.

It is desirable that color carrier 610 have a frequency of an odd multiple of $\frac{1}{2}$ the horizontal frequency as in a conventional aspect ratio NTSC signal. Therefore, the frequency of color carrier 610 is selected to be the closest frequency to $4/5 \times Sc$ which meets the above mentioned criterion.

Selection code 220' of decoder 400' of FIG. 8 is coupled to phase-lock loop circuit 611 of FIG. 7 for controlling the frequency of color carrier 610 of FIG. 7. The frequency of color carrier 610 is controlled by code 220' to be proportional to the ratio between the aspect ratio of display 604 of FIG. 7 and the aspect ratio of the picture that is contained in high definition NTSC signal 600 of FIG. 3.

What is claimed is:

1. Television apparatus for displaying a central portion of a wide screen color image on a standard aspect ratio display, comprising:

a first source for providing a composite video input signal having a line rate, a field rate and a color subcarrier frequency conforming to a given standard, said video input signal being representative of a wide screen image having a given aspect ratio greater than 4:3;

memory means coupled to said source for storing samples of said composite video input signal, for recovering stored samples which represent a central portion of said wide screen image and for concurrently time expanding the recovered samples by a given expansion factor selected such that each horizontal line of recovered expanded samples occupies an active line interval conforming to said given standard to provide a composite video output signal representative of an image having an aspect ratio reduced to 4:3;

a second source for providing a demodulation carrier wave having a frequency proportional to said color subcarrier frequency multiplied by said aspect ratio of said video output signal and divided by said aspect ratio of said video input signal and selected to be an odd multiple of one-half said line rate of said video input signal;

processor means responsive to said composite video output signal and to said demodulation carrier wave for providing a processed output signal of component forms; and display means having an aspect ratio of 4:3 for displaying said processed video output signal.

2. A variable aspect ratio television display apparatus, comprising:

input means for receiving a video input signal of time division multiplexed form having line and field rates conforming to a given broadcast standard, each active line thereof comprising time-sequential time-compressed luminance and chrominance components representative of an image having an aspect ratio which may vary between a standard 4:3 ratio and a higher wide-screen ratio;

a source for providing an aspect ratio control signal;

memory means having a write mode for sequentially storing said components of a given line in respective separate locations and having a read mode for recovering the stored components simultaneously during an immediately following line interval and for concurrently time expanding the recovered components by selected expansion factors;

memory control means coupled to said memory means for controlling said expansion factors such that for a first condition of said control signal said memory means expands only a central portion of said components and under a second condition said memory means also expands end portions of said components, wherein for either conditional said components are expanded so as to be in time registration with each component conforming to a standard active line interval of said given broadcast standard;

display means coupled to said memory means and synchronized with said video input signal for displaying said expanded components at said given line and field rates with said standard aspect ratio of 4:3; and circuit means in said memory control means for varying the frequency and timing of a write clock as a function of said control signal such that the number of samples stored is independent of said aspect ratio of said video input signal.

3. A television apparatus as recited in claim 2 wherein said higher wide-screen ratio is 5:3.

4. A television apparatus as recited in claim 2 wherein said time division multiplexed video input signal is of the MAC format.

* * * * *